United States Patent

[11] 3,611,100

| | | |
|---|---|---|
| [72] | Inventor | Albert N. McQuown, Jr.<br>309 McConnell Drive, Austin, Tex. 78746 |
| [21] | Appl. No. | 38,836 |
| [22] | Filed | May 20, 1970 |
| [45] | Patented | Oct. 5, 1971 |

[54] SERVOCONTROL METHODS AND APPARATUS FOR COMPLEX SYSTEMS
21 Claims, 4 Drawing Figs.

[52] U.S. Cl. .................................................. 318/561, 318/619
[51] Int. Cl. ....................................................... G05b 11/01
[50] Field of Search ........................................... 318/561, 619; 235/150.1

[56] References Cited
UNITED STATES PATENTS

| | | | |
|---|---|---|---|
| 3,149,270 | 9/1964 | Smyth et al. ................... | 235/150.1 X |
| 2,753,503 | 6/1956 | Wideroe ....................... | 235/150.1 X |
| 2,972,446 | 2/1961 | White ........................... | 318/561 X |
| 2,972,447 | 2/1961 | White ........................... | 235/150.1 X |

*Primary Examiner*—Benjamin Dobeck
*Attorneys*—Arnold, White & Durkee, Tom Arnold, Bill Durkee, John F. Lynch, Louis T. Pirkey, Frank S. Vaden, III and Robert A. White ABSTRACT: Improved servocontrol methods and apparatus are provided for adjusting one or more operating parameters in a regulated system having a gain-dependent characteristic and a time-dependent characteristic. In one form of the invention, means is provided for regulating each selected parameter by generating an initial command signal in response to any selected control signal, but which is modulated according to a preselected gain-dependent characteristic independent of the gain-dependent characteristic of the regulated system. Thereafter, and after a delay selected to compensate for any time-dependent characteristic of the regulated system, a gain-matching feedback adjustment is made to provide a second command signal having a gain-dependent characteristic corresponding to the gain-dependent characteristic of the regulated system.

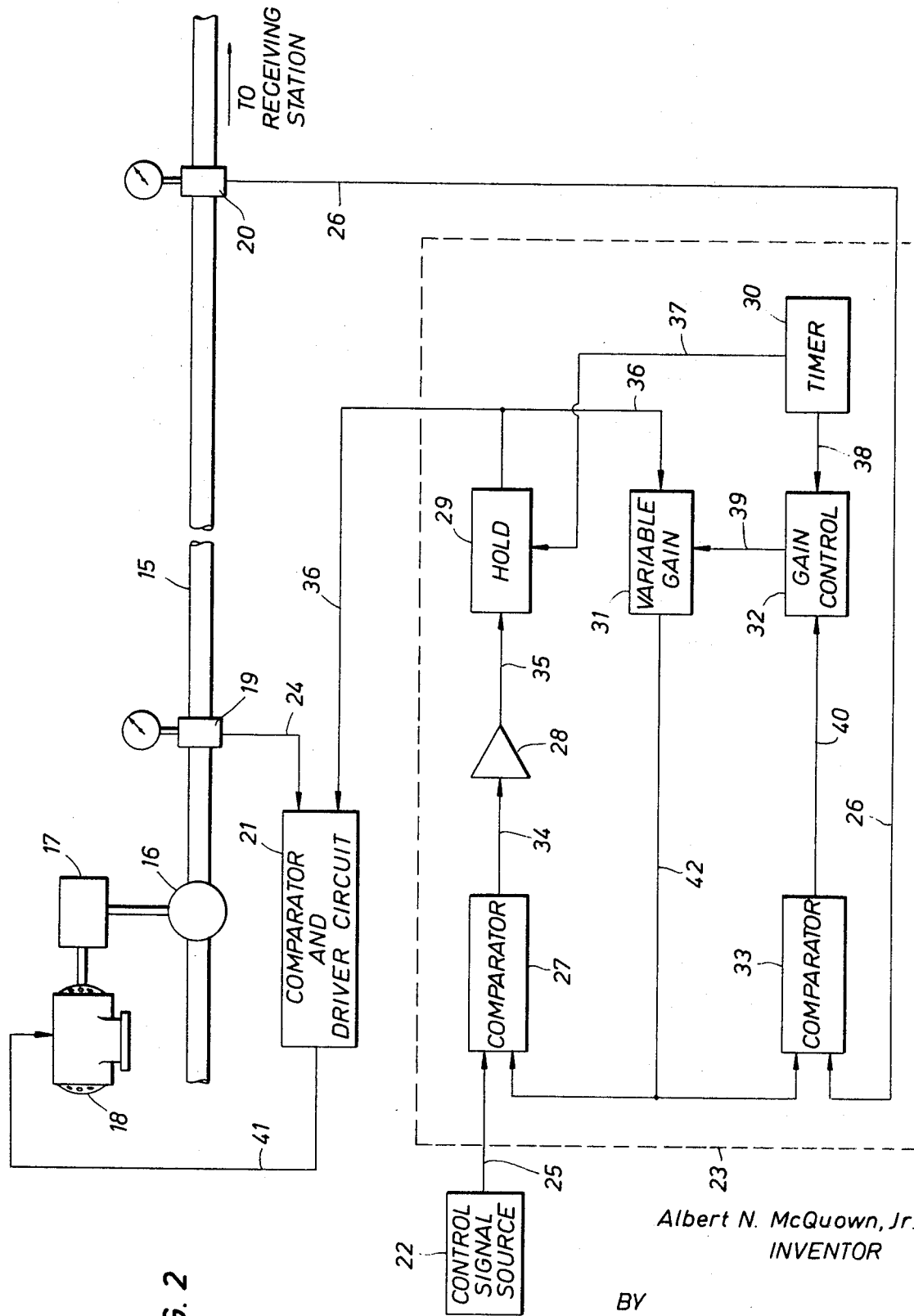

SERVOCONTROL METHODS AND APPARATUS FOR COMPLEX SYSTEMS

BACKGROUND OF INVENTION

This invention relates to methods and apparatus for regulating the operation of a system having a gain-dependent characteristic, and more particularly relates to servo methods and apparatus and the like for automatically controlling a complex system having either or both a time-dependent characteristic and a variable gain-dependent characteristic.

It is well known to employ servo methods and apparatus to regulate and control the operation of system, wherein command signals are generated and utilized to produce an output or other result having a preselected character and magnitude functionally related to the command signals. For example, it is especially well known to control electrically or hydraulically actuated gun or missile systems by electrical command systems provided by fire direction systems.

Such systems often have extremely complex operational characteristics, however. For example, positioning a heavy gun involves complex moments of inertia during both the initial and final portions of the operating cycle. Accordingly, it will be apparent that a command signal which will rotate a heavy mass of such character through a particular horizontal angle during a preselected time period must of necessity be a complex signal having time-dependent characteristics compensating for the inertia of the gun, in order that the gun not be carried past the selected position or direction.

Notwithstanding, feedback stabilization systems and techniques have long been employed to successfully correct the command signals employed to control the operation of systems of this type. For example, it is conventional to modulate fire control signals with a feedback loop, and it is further conventional to further correct the command or fire control signals by employing a stabilizing subsystem such as a tachometer which adjusts the feedback signal as a function of velocity. Thus, the apparent error resulting from the lag arising out of the inertia of the gun will be corrected by a supplemental signal indication the velocity of the moving gun, and this prevents the main feedback loop from overdriving the gun.

It will be apparent that, although a system such as heretofore described will involve a time-dependent characteristic functionally related to the inertia of the gun, the gun will nevertheless begin to move coincident with the beginning of the command signal. There are other systems of greater complexity, however, wherein time discontinuities are involved which may be fixed or variable in magnitude. For example, it is conventional to measure the flow rate at a selected location in a gas pipeline, and to utilize such measurement to regulate the flow therethrough at another different location remote therefrom. It will be apparent, in such an instance, that there will be a time delay between the attainment of the sought-for flow rate or pressure at the point of measurement, and the point at which such flow rate or pressure is established or attained at the control location, and that the magnitude of such delay will be functionally related to the distance between the two locations. It will further be apparent that a correction system of the type hereinbefore described as suitable for a fire control system will be insufficient to compensate and correct for the error arising from the time delay. Accordingly, the correction system incorporated to regulate the flow rate at the control location will tend to provide a signal must greater than that actually required because of the delay in receiving a feedback measurement signal which indicates the commencement of a change in flow rate at the measurement location.

Many attempts have been made to provide more precise control methods and apparatus for regulating systems of such character, but no apparatus or method has until now been devised which has been entirely satisfactory. For example, in a system such as a pipeline, the time delay is usually predetermined according to the operating parameters intended to be employed, and complex computer equipment is then programmed according to this predetermination to adjust the control signal as a function of the delay. Although such a technique will correct the command signal within extremely precise limits, it is entirely dependent upon a particular set of parameters. Accordingly, it is usually necessary to completely reprogram the computer in the event of a change in only one of the operating parameters of the system. Moreover, and equally important, computer equipment of this type is quite expensive to maintain and operate as well as to acquire.

SUMMARY OF INVENTION

These disadvantages of the prior art are overcome with the present invention, and novel methods and apparatus are provided herein for automatically controlling a complex system having fixed or variable time-discontinuity characteristics or the like as well as time-dependent transfer characteristics.

The present invention may be employed to regulate the operation of a system having either a fixed or variable gain-dependent characteristic, or a time-dependent characteristic, or both. Further, such time-dependent characteristic may be either the rise time associated with the gain-dependent characteristic, or it may be a complete time discontinuity unassociated with the gain-dependent characteristic of the system sought to be controlled.

Accordingly, a particularly suitable embodiment of the present invention may include means responsive to the control signals for providing functionally related command signals which are nevertheless modified to compensate for the time-dependent characteristic of the system, and which are further modified to incorporate a gain-dependent characteristic matching the gain-dependent characteristic of the system. In particular, the invention may be embodied in a servo-type apparatus which receives the control signal intended to adjust a selected parameter of the system to be controlled, and which initially responds to the incoming control signal by providing an initial output or command signal functionally related to a preselected or random gain-control function as well as to the magnitude of the system parameter sought to be established.

The gain-dependent characteristic of the initial control will, of course, not necessarily correspond to or match the gain-dependent function of the operating system. Accordingly, the initial command signal may not provide the proper adjustment as will be indicated by the measurement taken after the system has received the initial command signal. Thus, the invention preferably further includes a gain-matching section for causing the next command signal derived from the incoming control signal to incorporate a new gain-dependent characteristic matching that of the operating system.

These and other features and advantages of the present invention will become apparent from the following detailed description, wherein reference is made to the figures in the accompanying drawings.

IN THE DRAWINGS

FIG. 2 is another simplified functional representation of a particular form of the invention as embodied in a controller associated with a gas pipeline or the like.

3 is another simplified functional diagram representing an automatic shock spectrum generator in association with a controller embodying a form of the present invention.

Figure 4:
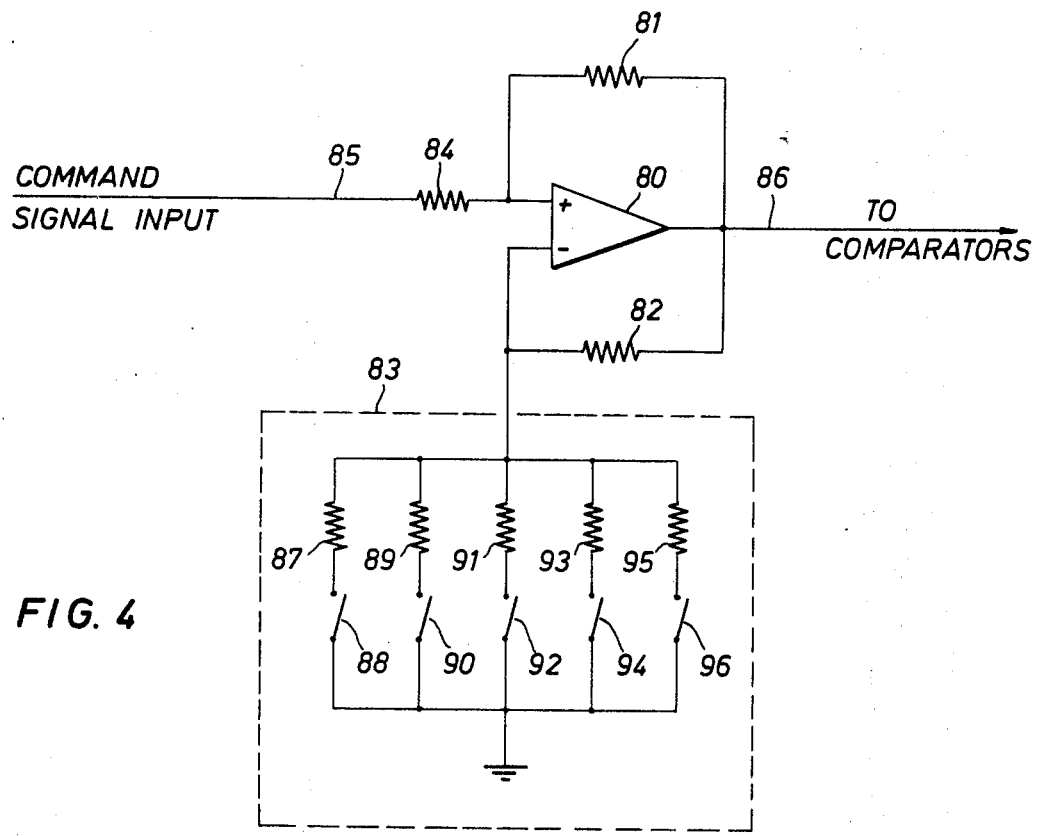

FIG. 4 is a simplified schematic representation of a portion of the apparatus depicted in FIG. 2, and more particularly illustrates a preferred embodiment of the variable gain section illustrated in the invention to match the gain-dependent characteristic of the operating system and the gain-dependent characteristic of the servocontroller.

DETAILED DESCRIPTION

Figure 1:
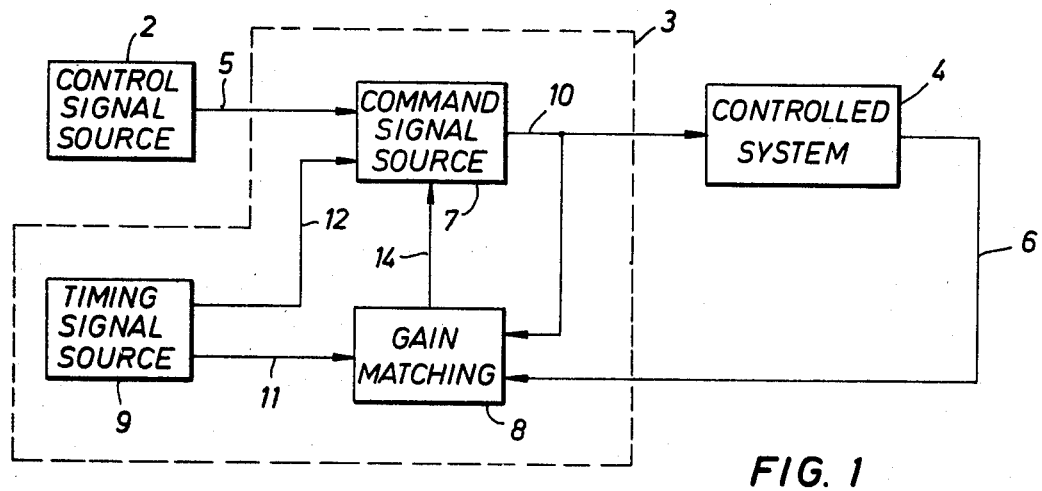
FIG. 1 is a simplified functional representation of a system incorporating a controller embodying one form of the present invention.

Referring now to FIG. 1, there may be seen a simplified block diagram functionally representing certain essential features of one embodiment of the present invention. In particular, there may be seen a functional representation of a controlled system 4 indirectly responsive to a suitable control signal 5 provided by a remotely located control signal source 2. As further indicated by the heavy dashed line, however, the control signal 5 is translated by the controller section 3 into an appropriate command signal 10 which is functionally related to the operating parameter of the controlled system 4 chosen to be adjusted.

The controller 3 may be seen to include a suitable command signal source 7 which provides the appropriately modulated command signal 10 in response to a gain-matching network or feedback system 8 and a suitable timing section 9, as well as in response to the input control signal 5. Thus, the command signal 10 may also be seen to be applied to one of the two inputs of the gain-matching network or section 8 which has its other input connected to receive a feedback measurement signal 6 indicating the actual magnitude of the operating parameter sought to be adjusted. In response to signals 10 and 6, the gain-matching section 8 will adjust the gain function signal 14 in a manner relevant to the gain-dependent characteristic of the system 4 whenever the timing source 9 generates the second timing signal 12.

As hereinbefore explained, it is a purpose of the controller 3 to match the gain-dependent characteristic of the command signal 10 to the gain-dependent characteristic of the controlled system 4. In addition, however, and whenever necessary, the command signal 10 may be provided with a time-dependent characteristic corresponding to a selected time-dependent characteristic of the system 4, such as a time discontinuity. Further, it will be noted that the command signal source 7 may be initially provided with a gain-dependent characteristic which is independent of the gain-dependent characteristic of the controlled system 4.

In the apparatus depicted in FIG. 1, the timing signal source 9 initially provides a first timing signal 12 to the command signal source 7 for the purpose of holding the command signal 10 at a constant level or valve until the measurement signal 6 is supplied to the gain matching section 8 and the gain-matching function has been completed. Thereafter, and as determined by the timing signal source 9, the first timing signal 12, may be discontinued to release the command signal 10. However, it should be noted that the timing signal source 9 generates the second timing signal 11 to the gain-matching section 8 during the gain-matching function, in order to cause the gain-matching section 8 to adjust the gain-function signal 14 before the command signal 10 is released. Thus, the command signal 10 will now incorporate the appropriate gain-dependent function corresponding to or matching the gain-dependent function in the controlled system 4.

Referring to FIG. 2, there is illustrated a simplified partially pictorial representation of a controlled gas pipeline or the like, and further depicting a suitable controller embodying one form of the present invention and interconnected with the pipeline system to regulate a selected operating parameter such as pressure or flow rate or the like. In particular, there is depicted a portion of the pipeline 15 including a suitable gate valve 16 or other control device, and further including a pair of meters 19 and 20 arranged at different locations along the pipeline 15. Thus the first meter 19 is preferably located at or adjacent the gate valve 16, whereas the second meter 20 is preferably located remotely of the first meter 19 and at the location wherein the magnitude of the operating parameter is of interest. Accordingly, it will be apparent that the depicted pipeline system will incorporate a time-dependent operating characteristic which corresponds to the time discontinuity between the change in the operating parameter produced at the first meter 19 by adjustment of the gate valve 16, and the evidence of such change at the remote meter 20. This, of course, is caused by the distance which the gas or other fluid must flow between the two meters 19 and 20.

The gate valve 16 may be of any conventional type, and may be actuated by an electric motor 18 interconnected therewith by means of a suitable gear box 17. In addition, there may also be provided a conventional comparator and motor driver circuit 21 having its output signal 41 connected to actuate and drive the motor 18.

As further depicted in FIG. 2, a control signal source 22 may be located at the dispatcher station to provide a control signal 25, and a controller 23 embodying the concept of the present invention may be interconnected to receive this control signal 25. The depicted controller 23 may be seen to include a pair of comparator circuits 27 and 33 of conventional design, wherein the first comparator 27 is connected to deliver a parameter error signal 34 to the input of an amplifier 28 furnishing an amplified error signal 35 to one of the inputs of a suitable hold circuit 29. The output of the hold circuit 29 functions as the command signal 36 being applied to one of the two inputs of the pipeline comparator and driver circuit 21 which has its other input connected to receive a measurement signal 24 provided by the meter 19.

As may further be seen in FIG. 2, there may be included a suitable timing signal source 30 connected to provide a first time signal 37 to the hold circuit 29 and a second time signal 38 to one of the two inputs of a suitable gain control 32. The other input of the gain control 32 may be connected to receive a gain error signal 40 from the second comparator 33, and the output of the gain control 32 may be an adjustment function or signal 39 applied to the variable gain section 31 which has its other input connected to the command signal 36. The variable gain section 31, in turn, generates a feedback signal 42 to the other input of the first comparator 27, and also to one of the inputs of the second comparator 33 which, in turn, has its other input connected to receive a measurement signal 26 from the remotely located meter 20.

Referring again to FIG. 2, it will be noted that the comparator 27, amplifier 28, hold circuit 29, and variable gain 31, constitute a closed loop servo amplifier, or the like. The first comparator 27 may be of any suitable design but is preferably an analog difference comparator, whereby the parameter error signal 34 is the difference between signals 25 and 42.

The purpose of the amplifier 28 is to provide an amplified error signal 35 which will be of command signal 36 magnitude, with a minimum difference between signals 25 and 42. The variable gain 31 may be any suitable means, such as a motor-driven potentiometer providing a simple output voltage 42. In such a case, however, the voltage 42 will be a function of the position of the potentiometer and the magnitude of the command signal 36. Accordingly, the position of this potentiometer will correspond to and determine the gain-dependent characteristic provided to the command signal 36 by the aforementioned feedback control loop.

The hold section 29 may be any suitable type of circuit, such as a conventional switch and capacitor (not depicted), since its function is to hold the command signal 36 at a constant level or value while the variable-gain section 31 is adjusted by the gain control 32. Accordingly, the hold circuit 29 may be conveniently actuated by merely opening the switch (not depicted), whereby the accumulated charge on the capacitor (also not depicted) will then constitute the command signal 36.

Referring now to the timing signal source 30, it will be seen that the first time signal 37 may be applied to open the aforementioned switch in the hold circuit 29, and thus the command signal 36 will remain at a constant magnitude as long as the first time signal 37 continues. The timing signal source 30 also preferably includes a suitable time delay circuit (not depicted) which may be manually or automatically adjusted so as to initiate the second time signal 38 after a time interval which is preferably at least as great as the time discontinuity of the pipeline system 15. Thus, the preselected delay interval will be sufficient to include the arrival of the measurement signal 26 being supplied to the second comparator 33 by the second or remote meter 20.

The second comparator 33 may be any conventional design, but for purposes of the present invention is is preferably adapted to generate the gain error signal 40 in the form of a signal having an amplitude which is constant except when signals 42 and 26 are equal. When signals 42 and 26 are equal, however, the second comparator 33 preferably abruptly discontinues the gain error signal 40 from the gain control 32. In this form of the present invention, the gain control 32 will preferably be a digital counter register which is connected to generate an increasing adjustment signal 39 so long as the gain error signal 40 continues to be produced by the comparator 33 and stop when signals 42 and 26 are equal. The purpose of the second time signal 38 is to cause the gain control 32 to respond upon the expiration of the preselected delay interval.

Figure 3:
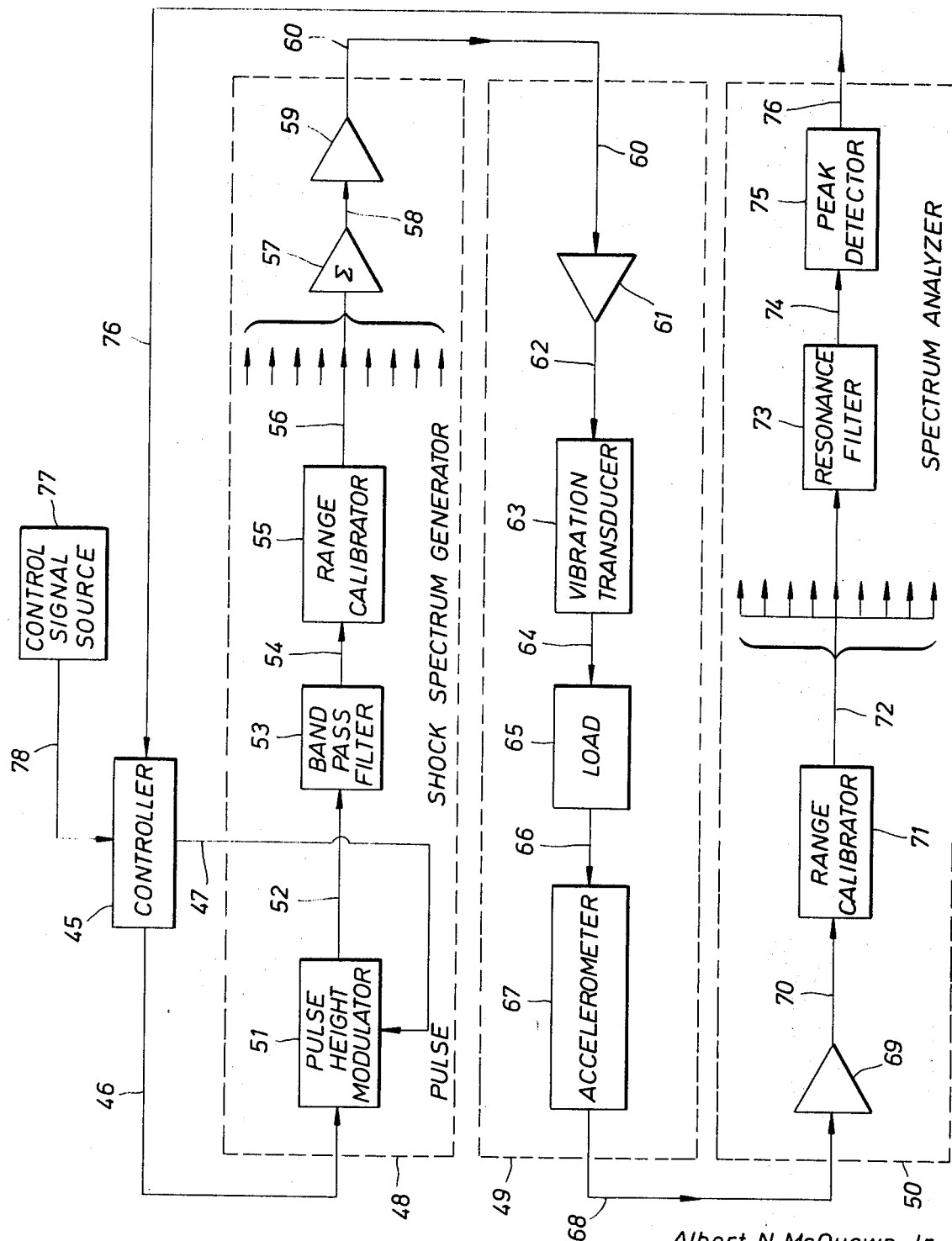

Although the present invention has heretofore been explained with respect to regulation of a single operating parameter, it is also applicable to complex systems having two or more controllable parameters. Referring now to FIG. 3, there may be seen a simplified functional representation of an automatic shock spectrum system of generally conventional design, which may have as many as 23 different operating parameters, but which can nevertheless be adequately regulated by a controller 45 of the type depicted in FIGS. 1 and 2. Accordingly, the basic components of the shock spectrum system may be a shock spectrum generator section 48, a shock spectrum analyzer section 50, and a vibration section 49 which, for purposes of the present invention is depicted as including the load which is intended to receive the shock or impact generated.

Specifically, the controller 45 may be actuated by a control signal source 77 generating a suitable control signal 78 as hereinbefore described, and the controller 45 is connected to respond to the control signal 78 by generating a suitable command signal 46 also as hereinbefore described. In addition, however, the controller 45 also generates a third time signal 47 which may be provided by the timing signal source 30 depicted in FIG. 2. As hereinbefore explained, the shock spectrum system is a multichannel apparatus since the mechanical shock or impact which it is intended to provide is actually a composite of a plurality of different preselected signals. Each of these signals is sought to be regulated separately of each other, however, since each is determinative of a different characteristic of the ultimate shock. Accordingly, each characteristic will be regulated by a different controller 45 and control signal source 77. For purposes of simplicity, however, only one such control signal source 77 and controller 45 has been depicted in FIG. 3.

The purpose of the shock spectrum generator section 49 is to provide a composite signal which has been modulated in accordance with each of the various characteristics sought to be controlled. Accordingly, the shock spectrum generator 48 will have a plurality of input channels as hereinbefore described, and each channel will include a pulse height modulator 51 connected to receive its appropriate control signal 46 from its appropriate controller 45. In response thereto, the modulator 51 will generate an excitation signal 52 which may be applied to the input of a suitable band-pass filter 53, and the filtered signal 54 exiting from the band-pass filter 53 may then be applied to the input of a range calibrator 55 having its output signal 56 connected to one of the various inputs of a summation amplifier 57. The summation amplifier 57, however, is connected to generate a single composite output signal 58 which may be further amplified by an another amplifier 59 to form the amplified composite signal 60 connected to the input of the power amplifier 61 functioning as the first or input stage of the vibration section 49.

Referring now to the vibration section 49, it may be seen that the aforementioned power amplifier 51 functions to provide a further amplified composite signal 62, which, in turn, is applied to a suitable vibration transducer 63 to create the mechanical shock wave 64 being applied to a suitable load 65.

The effect had on the load 65 as a result of receiving the mechanical shock wave 64 is indicated by the arrow 66, and may be translated into an electrical or other indicating signal 68 which is thereafter applied to the input of a suitable preamplifier 69 forming the first or input stage of the spectrum analyzer section 50.

Referring now to the spectrum analyzer section 50, the preamplifier 69 may be seen to provide an amplified indicating signal 70 which is applied to the input of a suitable range calibrator 71 connected in inverse relationship to the range calibrator 55 in the shock spectrum generator section 48. The calibrated composite signal 72 being provided by the range calibrator 71 will be a composite of all of the various characteristics provided by each of the output signals 56 delivered to the summation amplifier 57. Thus, a series of resonance filters 73 may be provided which are each tuned to match a different band-pass filter 53, and which are also connected to each pass only a selected frequency or other portion of that signal 72 to the peak detector 75 in the form of a filtered signal 74. The peak measurement signal 76, which is provided by the peak detector 75, may then be applied to the particular controller 45 associated therewith in the same manner as is the measurement signal 26 depicted in FIG. 2. It will thus be apparent from a consideration of the methods and apparatus depicted in FIG. 3, that the present invention is capable of providing automatic control of a complex system having a multiplicity of different operating parameters, and more particularly that these operating parameters each have different time-dependent and gain-dependent characteristics.

Referring now to FIG. 4, there may be seen a simplified schematic representation of a circuit which has been found especially suitable to provide the function of the variable-gain section 41 depicted in FIG. 2. In particular, the apparatus may be seen to include a conventional operational amplifier 80 having its positive input terminal connected to the junction between one end of a suitable input resistor 85 and one end of a suitable positive feedback resistor 81. The other end of the positive feedback resistor 81 may be connected to the junction between the output of the amplifier 80 and one end of a suitable negative feedback resistor 82. The other end of the input resistor 84 is connected to receive a command signal 85 such as is provided by the output of the hold circuit 29 depicted in FIG. 2.

The negative feedback resistor 82 is connected at its other end to the junction between the negative input terminal of the amplifier 80 and the output terminal of a suitable gain determining resistance network 83. As may be further seen in FIG. 4, the network 83 may be formed from a plurality of switch and resistor elements interconnected in parallel and each having their opposite ends connected to ground or reference voltage. More particularly, the network may be composed of a suitable plurality of resistors 87, 89, 91, 93, and 95, each being connected at one end to the negative input terminal of the operational amplifier 80, and each being separately connected at its other end to one of a corresponding plurality of switching elements 88, 90, 92, 94, and 96. The switchs may be selectively opened and closed by any suitable means (not depicted in FIG. 4) such as the gain-control apparatus 32 depicted in FIG. 2, except that the switches depicted in FIG. 4 will preferably be actuated in a binary fashion.

As hereinbefore stated, the gain of the operational amplifier 80 will tend to be increased as a function of the manner in which the selected ones of the various switches 88, 90, 92, 94 and 96 are opened and closed, and thus the gain of the operational amplifier 80 will increase in a nonlinear manner closely approximating a logarithmic function within easily predetermined operating limits.

It will be apparent from the foregoing that many other variations and modifications may be made in the structures and methods described herein without substantially departing from the essential concept of the present invention. Accordingly, it should be clearly understood that the forms of the invention described herein and depicted in the accompanying drawings, are exemplary only and are not intended as limitations in the scope of the present invention.

What is claimed is:

1. A method of adjusting a selected parameter of an operating system having a gain-dependent characteristic, comprising
generating a primary signal functionally related to the magnitude of said parameter sought to be established,
deriving from said primary signal a first command signal having a first gain dependent characteristic, said first command signal being derived independently of the gain-dependent characteristic of said operating system,
thereafter and after a delay interval generating a measurement signal functionally related to the actual magnitude of said parameter,
deriving from said primary signal and said measurement signal a second command signal having a second gain-dependent characteristic corresponding to said gain-dependent characteristic of said system,
matching said gain-dependent characteristic of said second command signal with said gain-dependent characteristic of said operating system,
said system having a time-dependent characteristic substantially corresponding to said delay interval, and being a time discontinuity not greater in duration than said delay interval,
adjusting said operating system as a function of said second command signal,
adjusting said operating system as a function of said first command signal, and
maintaining said first command signal at a constant magnitude during said delay interval.

2. The method described in claim 1, wherein said first command signal is maintained at said constant magnitude while said gain-dependent characteristic of said second signal is matched with said gain-dependent characteristic of said operating system.

3. Control apparatus for adjusting a selected parameter of an operating system having a gain-dependent characteristic, comprising
a command signal source for deriving first and second command signals each having a gain-dependent characteristic and each in response to a control signal functionally related to the magnitude of said parameter sought to be established, a first comparator responsive to said control signal and said function means for generating said first and second command signals and holding means responsive to said first timing means for maintaining said first command signal at a constant magnitude,
gain-function means responsive to the actual magnitude of said parameter for causing the gain-dependent characteristic of said second command signal to substantially match said gain-dependent characteristic of said operating system,
timing means interconnected with said command signal source and said gain-matching means,
said timing means generating a first time signal holding said first command signal at a constant magnitude which said function means causes said gain-dependent function of said second command signal to match said gain-dependent function of said operating system,
said timing means further generating a second timing signal actuating said function means, and
said second timing signal being generated during said first timing signal.

4. The apparatus described in claim 3, wherein said gain-function means further comprises
a gain-varying means connected to receive said second timing signal,
a function generator actuated by said gain-varying means and said first command signal for generating a function signal having a gain-dependent characteristic substantially matching said gain-dependent characteristic of said system, and
a second comparator means responsive to said function signal and a measurement signal functionally related to the actual magnitude of said gain-dependent characteristic of said system for actuating said gain-varying means in cooperation with said second timing signal.

5. The apparatus described in claim 4, wherein said first comparator is responsive to said control signal and said function signal.

6. The apparatus described in claim 5, wherein said timing means is further adapted to generate said second timing signal after a delay interval commencing with the generation of said first timing signal and substantially corresponding to a time-dependent characteristic of said operating system.

7. The apparatus described in claim 6, wherein said delay interval is a preselected interval terminating after the receipt of said measurement signal by said second comparator and at least as great as any time-discontinuity characteristic of said operating system.

8. The apparatus described in claim 7, wherein said function generator comprises.
an operational amplifier having a positive feedback loop interconnected and responsive to said first command signal and also having a negative feedback loop, and
a control network responsive to said gain-varying means and interconnected with said negative feedback for varying the gain of said amplifier in a nonlinear manner approximating a logarithmic function.

9. A method of controlling an output parameter of a gain-dependent operating system from a primary signal functionally related to said parameter sought to be established comprising
deriving a first command signal related to said primary signal and an initial gain characteristic,
applying said first command signal to both said operating system and a separate but parallel variable gain element,
thereafter and after a suitable delay interval, generating a measurement signal functionally related to the actual output parameter of said operating system,
applying said first command signal and said measurement signal to said variable-gain element to provide an adjusted gain characteristic of said variable-gain element that corresponds to the gain of said operating system, and
deriving from said primary signal and said adjusted gain characteristic of said variable-gain element a second command signal related to the measured gain of said operating system.

10. The method described in claim 9, wherein said first command signal is held at a constant value during a period of time corresponding to that required by the variable-gain element to change from said initial gain characteristic to said adjusted gain characteristic.

11. The method described in claim 10, wherein said first command signal is held at a constant value for an additional period of time corresponding to an operational delay interval of said operating system.

12. The method described in claim 11, wherein said measurement signal and said second gain characteristic are generated after a period of time corresponding to a time-dependent transient-gain characteristic of said operating system.

13. An apparatus for controlling an output parameter of a gain-dependent operating system comprising
means for generating a primary signal functionally related to the said parameter sought to be established,
a variable-gain element,
means for generating first and second command signals functionally related to said primary signal and the gain characteristics of said variable-gain element,
means for generating a measurement signal functionally related to said output parameter, and
means for applying said first command signal and said first measurement signal to said variable-gain element to cause adjustment of the signal from said variable-gain element to match to the gain of said operating system.

14. The apparatus described in claim 13, including timing means and signal holding means causing the said first command signal to be held at a constant value in response to a first timing signal from said timing means for a period of time corresponding to the time required for said adjusted gain signal of said variable-gain element to match the gain of said operating system, and means generating a second command signal subsequent to matching of said signal from said variable-gain element and the gain of said operating system and for a suitable period of time, said second command signal being functionally related to said primary signal and to said matched gain of said variable-gain element.

15. The apparatus described in claim 14, wherein said timing means further causes the said first command signal to be held at a constant value for an additional period of time corresponding to any other time-dependent characteristic of said operating system.

16. The apparatus described in claim 15, wherein said timing means generates a second timing signal which causes the said variable-gain element to adjust to match the gain of said operating system after a period of time corresponding to any time-dependent characteristic of the said operating system.

17. The apparatus described in claim 16, wherein said command signal-generating means further comprises
first comparator and amplifier means responsive to said primary signal and a function signal from said variable gain element, and
holding means responsive to said first timing signal for maintaining said first command signal at a constant magnitude.

18. The apparatus described in claim 17, wherein said variable gain element further comprises
gain-varying means being responsive to said second timing signal,
said variable-gain element being actuated by said gain varying means and generating a function signal dependent on said first command signal and gain characteristic of said variable-gain element, and
second comparator means being responsive to said function signal and said measurement signal and causing said gain-varying means in cooperation with said second timing signal to adjust said variable-gain element to match the gain of said operating system.

19. The apparatus described in claim 18, wherein said timing means is further adapted to generate said second timing signal after a delay interval commencing with the generation of said first timing signal and substantially corresponding to a time-dependent characteristic of said operating system.

20. The apparatus described in claim 19, wherein said delay interval is a preselected interval terminating after the receipt of said measurement signal by said second comparator and at least as great as any time-discontinuity characteristic of said operating system.

21. The apparatus described in claim 18, wherein said variable-gain element comprises
an operational amplifier having positive feedback loop and a negative feedback loop, and
a control network as part of the negative feedback loop responsive to said gain-varying means, the gain characteristics of said amplifier varying in response to said positive feedback and controlled negative feedback in a nonlinear manner approximating an exponential function.